No. 637,085. Patented Nov. 14, 1899.
G. N. CHASE.
BICYCLE BRAKE.
(Application filed June 29, 1897.)
(No Model.) 3 Sheets—Sheet 1.
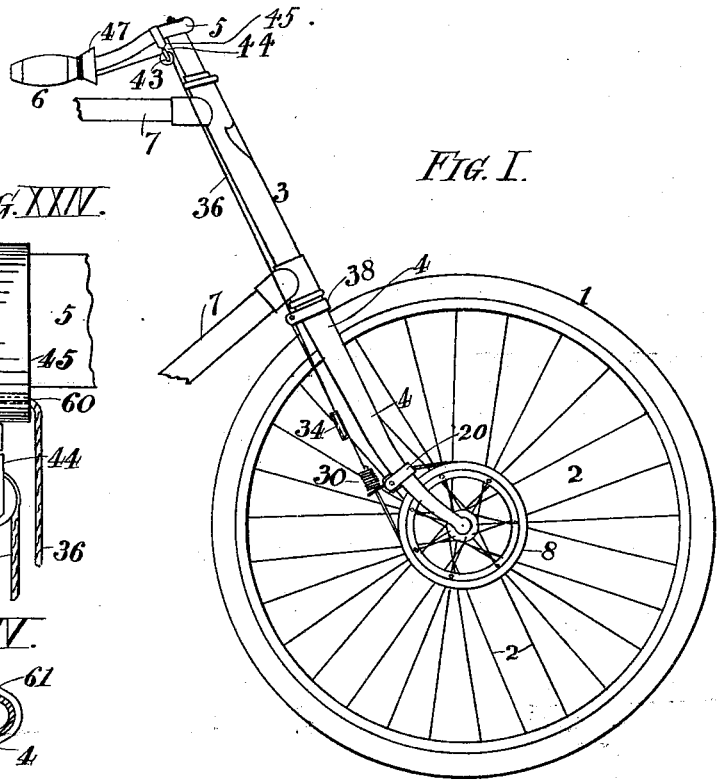
Fig. I.
Fig. XXIII. Fig. XXIV.
Fig. XXV.
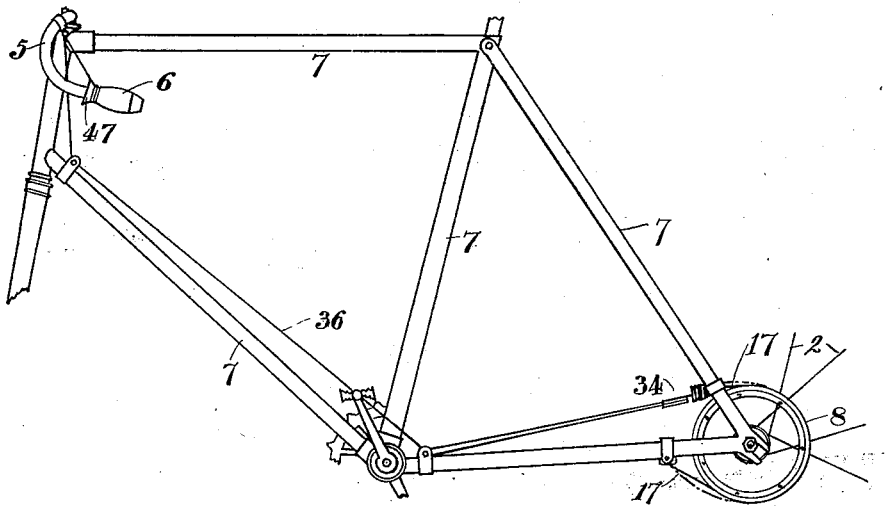
Fig. II.
Witnesses: Inventor.

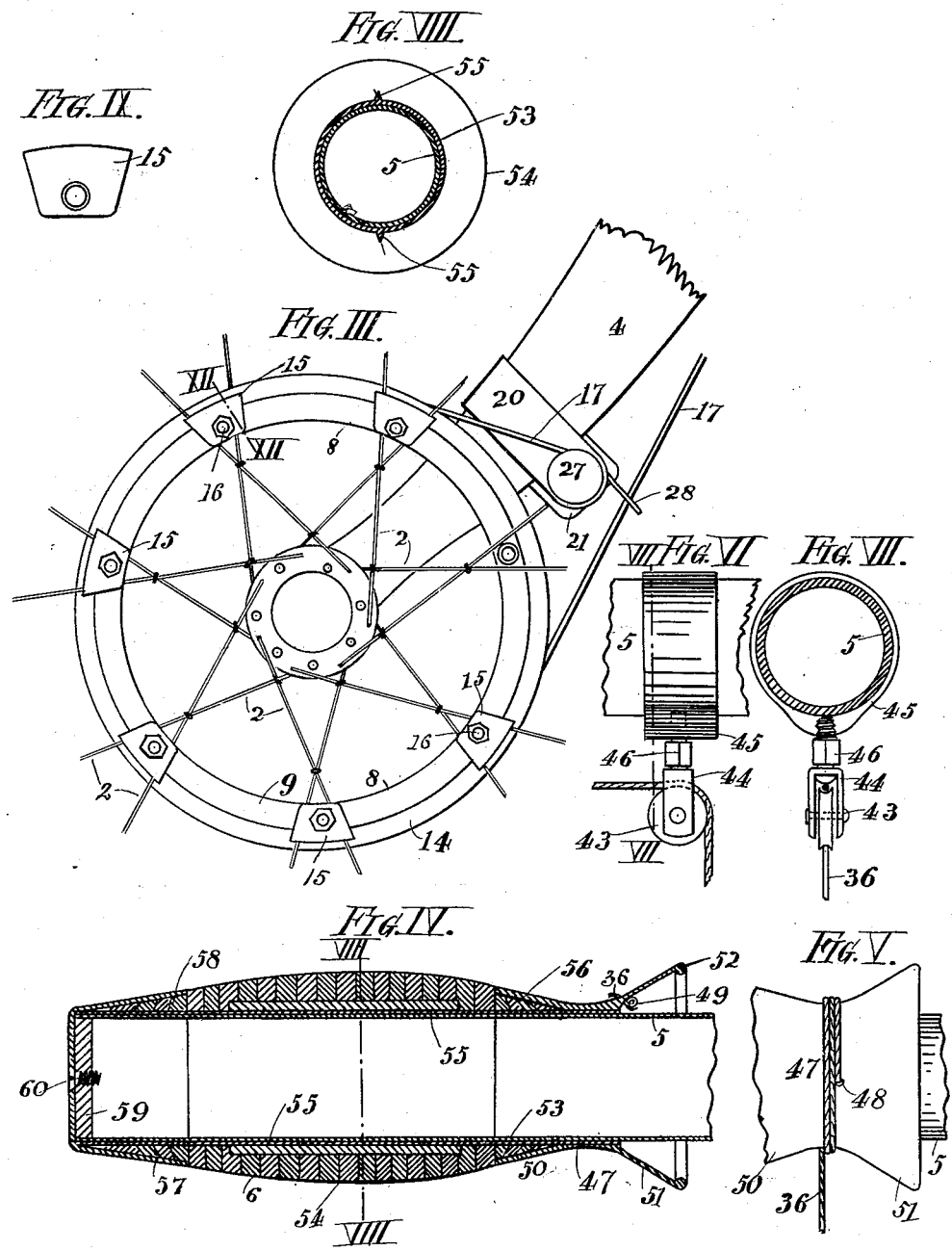

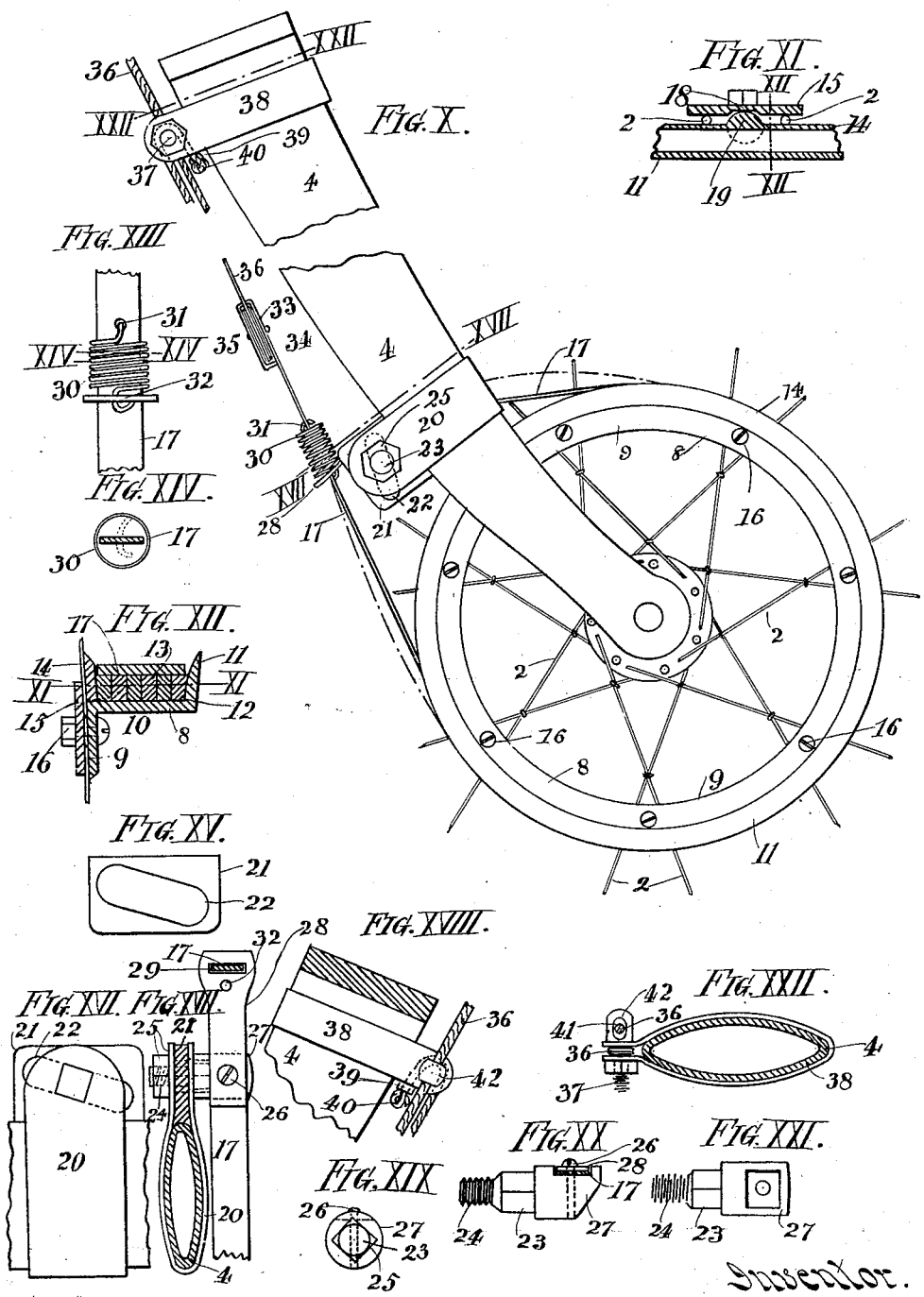

UNITED STATES PATENT OFFICE.

GEORGE N. CHASE, OF THE UNITED STATES ARMY.

BICYCLE-BRAKE.

SPECIFICATION forming part of Letters Patent No. 637,085, dated November 14, 1899.

Application filed June 29, 1897. Serial No. 642,784. (No model.)

*To all whom it may concern:*

Be it known that I, GEORGE N. CHASE, lieutenant United States Army, residing at Pasadena, in the county of Los Angeles and State of California, have invented certain new and useful Improvements in Bicycle-Brakes and Brakes for Kindred Vehicles, of which the following is a full, clear, and exact description, reference being had to the accompanying drawings, which form a part of this specification.

My invention relates to an improved form of brake to be applied to bicycles and kindred vehicles; and my invention consists in certain features of novelty hereinafter described and claimed.

Figure I is a detail side elevation showing the front wheel, fork, standard, and part of the frame of a bicycle having my improved brake applied thereto. Fig. II is a detail side elevation of a bicycle-frame, showing my invention applied to the rear wheel. Fig. III is an enlarged detail side elevation showing the brake-ring attached to the spokes of a wheel. Fig. IV is an enlarged detail longitudinal section of my improved hand-grip secured to the handle-bar. Fig. V is a detail front elevation of the capstan connected with the grip on which the cord is wound when setting the brake. Fig. VI is a detail side elevation of the pulley and clamp connected with the handle-bar. Fig. VII is a section taken on line VII VII, Fig. VI. Fig. VIII is a transverse section taken on line VIII VIII, Fig. IV. Fig. IX is a side elevation of the washer or clamp for clamping the brake-ring to the spokes of the wheel. Fig. X is a detail side elevation of the brake-ring attached to the front fork, showing the brake-band in place, this view being the reverse of Fig. III. Fig. XI is a transverse section of the brake-ring taken on line XI XI, Fig. XII. Fig. XII is a section taken on line XII XII, Figs. III and XI. Fig. XIII is a detail side elevation showing the spring for holding the brake-band out of engagement with the brake-ring. Fig. XIV is a transverse section taken on line XIV XIV, Fig. XIII. Fig. XV is a side elevation of bearing-plate secured near the lower end of the fork. Fig. XVI is a detail side elevation of lower end of the fork, clamp, and bearing-plate. Fig. XVII is a transverse section taken on line XVII XVII, Fig. X. Fig. XVIII is a detail side elevation showing clamp on portion of fork for securing lower end of the cord for operating the brake. Fig. XIX is an end elevation of bolt to which the guide situated near the lower end of the fork is secured. Fig. XX is a side elevation of the guide-securing bolt, showing the guide in section. Fig. XXI is a plan view of the guide-holding bolt. Fig. XXII is a transverse section taken on line XXII XXII, Fig. X. Fig. XXIII is a transverse section of the handle-bar, showing a modified form of securing the fixed end of the operating-cord. Fig. XXIV is a side elevation of Fig. XXIII. Fig. XXV is a transverse section of the fork, showing modified form of clamp acting as guide for the operating-cord.

Referring to the drawings, 1 represents the front wheel, 2 the spokes, 3 the standard, and 4 the fork, of a bicycle.

5 represents the handle-bar, and 6 the hand-grip located near the outer end of the handle-bar.

7 represents the supporting-frame, which may be of any preferred construction.

8 represents my improved brake-ring, the body of which is Z-shaped in radial section, the same consisting of a vertical inner flange 9, a circular flange 10, and a vertical outer flange 11, the inner flange 9 extending inwardly from the circular flange 10 and the outer flange 11 extending outwardly and slightly laterally from the circular flange 10. Said brake-ring, which is annular in construction, is provided on its periphery with an annular recess 12 or groove, in which is placed a suitable bearing material 13, preferably made of rawhide rings, extending completely around the periphery of the brake-ring, said rawhide rings being held in position by means of an annular clamping-ring 14, said clamping-ring being held in position by means of a series of washers 15, secured at intervals to the brake-ring, said washers being held in place by means of screw-bolts 16. The outer flange 11 and the annular ring 14 of the brake-ring are preferably curved or dished outward near their outer ends, so that the ring 14 will conform to the dish of the wheel and so as to form ready access to the spring brake-band 17, which bears against the rawhide 13 when the brake is set. The annular ring 8 is preferably secured to the spokes 2 at a point a short distance beyond or outside of where the spokes cross each other, the screw 16 being located in the outer V formed by the crossing spokes and the washer 15 bearing against and clamping the spokes between said washer and the brake-ring. The washer 15, which is preferably keystone in shape, is provided on its inner face with a recess 18, into which a boss 19 on the side of the brake-ring extends, thus preventing the displacement of the washer.

20 represents a clamp surrounding one leg of the fork at a point just outside of the periphery of the brake-ring.

21 represents a bearing-plate or wedge having a diagonally-extending slot 22, said bearing-plate being interposed between the outer ends of the clamp 20 and fitting snugly against the under side of said leg of the fork 4.

23 represents a bolt having a square body which extends through apertures in the clamp 20 and through the slot 22 in the bearing-plate 21, the inner end of said bolt being threaded, as shown at 24, and having a nut 25 thereon for preventing its withdrawal from the slot, said bearing-plate 21 throwing the strain of the clamp 20 against the edge of the leg and holding said clamp firmly in position thereon. Owing to the tapering construction of the leg the clamp would tend to slide downward, this being obviated by the diagonal slot in the bearing-plate, the effect being that as the clamp tended to slide downwardly the bolt 23 would travel inwardly in said slot, thus forcing the bearing-plate in closer contact with the edge of the leg. The brake-band 17 extends nearly around the periphery of the annular brake-ring 8 and has its inner end secured by a screw-bolt 26 to the rounded head 27 of the bolt 23, said screw-bolt 26 also securing to said head a guide-bracket 28 by means of the screw passing through an aperture in the inner end of the guide-bracket. The bracket 28 extends outwardly and is provided with a transverse slot 29, through which one end of the brake-band 17 extends.

30 represents a coil-spring having its upper end secured in a hole 31, formed in the brake-band, and having its lower end secured in a hole 32, formed in the bracket 28, the purpose of said coil-spring being to assist the spring brake-band to expand, and thus throw off the brake on the annular brake-ring, (see dotted lines, Fig. X,) a slight expansion of the spring brake-band being sufficient to release the brake-ring without the body of the brake-band passing out of the groove in the brake-ring. The upper free end of the brake-band is preferably formed into a returned bend, forming a loop 33, in which is journaled a pulley 34 by means of a pin 35.

36 represents the operating cord or cable, by which power is transmitted to set the brake, the lower end of said cord being secured to a bolt 37, which passes through the outer ends of a clamp 38, secured to the fork 4, there being a small nut 39 placed on the end of said cord after it has passed around the bolt 37 and a knot 40 tied in the cord to prevent its withdrawal, or it may be fastened in a suitable manner to the swivel 44. The cord 36 extends downwardly and around the pulley 34, thence passes upwardly through an eye 41 in the head 42 of the bolt 37, said eye being chamfered and slightly elongated to avoid friction on the cord, said cord 36 extending upwardly along the standard to a point just beneath the handle-bar, to which is secured a pulley 43 by means of a swivel 44, said swivel being secured to a clamp 45 by means of a set-screw 46. The clamp 45 extends around the handle-bar 5 and is secured thereto by means of the set-screw 46. The cord, after passing over the pulley 43, extends to the hand-grip 6, the cord being connected to a capstan or reel 47 by having its end pass through a hole 48 in the same and secured therein by a knot 49. The capstan 47 is a part of the grip 6 and located at the inner end of the grip. The capstan flares outwardly in both directions from a point near its center, as shown at 50 51, the portion 51 of the capstan being of greater pitch than the opposite end to prevent the cord 36 from slipping over the same as the brake is manipulated. The inner end of the capstan, which is annular in contour, is provided with a bead 52, turned over to stiffen and form a finish to the inner end of the grip.

53 represents a sleeve operating on the handle-bar and to which the capstan and grip proper are secured by any suitable means. The grip proper is preferably formed of successive concentric layers of leather 54; but I do not confine myself to this construction.

55 represents knife-edge ribs radiating outwardly from the sleeve 53, there being corresponding grooves in the grip proper in order to prevent its slipping or turning on the sleeve without rotating the sleeve. The leather or other material 54 forming the grip proper preferably extends beneath the outer flaring end 50 of the capstan, as shown at 56.

57 represents a cap on the outer end of the grip for holding the leather or other material forming the grip proper upon the sleeve, said cap being annular in construction and flaring outwardly toward the grip proper, thus permitting a portion of the material forming the grip proper to pass beneath the cap, as shown at 58.

59 represents a plug secured in the outer end of the hollow handle-bar 5, to which the cap 57 is secured by means of a screw 60. As the grip is rotated the sleeve 53 is turned and with it the cap 57 and capstan 47. As the capstan is rotated the cord 36 is wound upon its outer surface, (see Fig. V,) thus drawing upon the brake-band 17 and firmly setting the brake on the brake-ring 8, a partial rotation of the grip and capstan being sufficient to firmly brake the wheel, when the grip is released the spring-band 17 instantly expanding and releasing the ring, the coil-spring 30 serving to overcome any excess of friction in the bearings, and thus assisting the spring-band to expand and release the pressure on the brake-ring. It is intended that the grips on the handle-bar be made similar in construction, so as to present the same appearance to the eye, this construction also permitting the cord 36, which is preferably made out of steel, to be attached to either grip desired. In Fig. II, I have made a slight modification showing my improved brake attached to the rear wheel instead of the front wheel, this being readily accomplished by placing suitable bearings on the frame, the construction and operation being the same on both wheels.

In Figs. XXIII and XXIV, I have shown a modification in which the fixed end of the operating-cord is carried up and secured in an orifice 60 in the clamp or ring 45 on the handle-bar.

In Fig. XXV, I have shown a modification in which a clamp 61 takes the place of the clamp 38, said modified clamp having a terminal loop 62, which serves as an additional guide for the operating-cord when the fixed end is carried up to the ring or clamp 45, said modified clamp 61 having a washer 63 interposed between its ends, said washer also serving as a bearing-plate against the edge of the fork.

I claim as my invention—

1. A bicycle-brake comprising a brake-ring secured to the spokes of the wheel, a clamp secured to the frame, a bearing-plate having a diagonal slot and engaging the edge of the frame, a square bolt passing through the clamp and through the diagonal slot, a brake-band having one end secured to the bolt and means in connection with the other end of the brake-band for pressing the latter into contact with the periphery of the brake-ring; substantially as described.

2. The combination with a frame and a wheel; of a brake-ring, a clamp-ring secured to the frame adjacent to the brake-ring, the bolt extending through the outer ends of the clamp, a guide-bracket secured to the bolt, the brake-band fixed at its inner end to the bolt, extending around the brake-ring and having its outer end extending through the guide-bracket, and means connected with the outer end of the brake-band for applying and releasing the brake-band; substantially as described.

3. The combination, with a fork, a handle-bar and a wheel having spokes; of a brake-ring secured to the spokes, a lower clamp secured to the fork adjacent to the brake-ring, a guide-bracket, the brake-band fixed at its inner end to the lower clamp, extending around the brake-ring and having its outer end extending through the guide-bracket and formed with a loop, the spring whereby the outer end of the brake-band is supported on the guide-bracket, the lower pulley journaled in the loop, the upper clamp secured to the fork adjacent to the wheel, the upper pulley secured to the handle-bar, the capstan on the handle-bar, and the operating-cord connected at its inner end to and extending from the upper clamp, around the lower pulley, thence around the upper pulley and connected at its outer end to the capstan; substantially as described.

GEORGE N. CHASE.

Witnesses:
JAS. E. KNIGHT,
J. A. RORLOFSZ.